US009169374B2

(12) United States Patent
Hernández-Zamora et al.

(10) Patent No.: US 9,169,374 B2
(45) Date of Patent: Oct. 27, 2015

(54) SYNTHETIC RAW ELASTOMERIC COMPOSITIONS IN FREE-FLOWING PELLET FORM AND PROCESS FOR OBTAINING THE SAME

(75) Inventors: Gabriel Hernández-Zamora, Tamaulipas (MX); Ricardo Sánchez-Ortega, Tamaulipas (MX); Zenón Rodríguez-Juárez, Tamaulipas (MX); Jesus Ismael Camacho-Salas, Tamaulipas (MX); Sergio Moctezuma-Espiricueto, Tamaulipas (MX)

(73) Assignee: DYNASOL ELASTOMEROS, S.A. DE C.V., Altamira, Tamaulipas (MX)

( * ) Notice: Subject to any disclaimer, the term of this patent is extended or adjusted under 35 U.S.C. 154(b) by 0 days.

(21) Appl. No.: 14/007,425

(22) PCT Filed: Mar. 21, 2012

(86) PCT No.: PCT/IB2012/000565
§ 371 (c)(1),
(2), (4) Date: Dec. 3, 2013

(87) PCT Pub. No.: WO2012/131458
PCT Pub. Date: Oct. 4, 2012

(65) Prior Publication Data
US 2014/0155523 A1   Jun. 5, 2014

Related U.S. Application Data

(60) Provisional application No. 61/467,733, filed on Mar. 25, 2011.

(51) Int. Cl.
| | | |
|---|---|---|
| C08K 3/30 | (2006.01) | |
| C08L 95/00 | (2006.01) | |
| C08K 13/02 | (2006.01) | |
| C08K 3/00 | (2006.01) | |
| C09J 147/00 | (2006.01) | |
| C08J 3/12 | (2006.01) | |
| B29B 9/12 | (2006.01) | |
| B29B 9/06 | (2006.01) | |
| B29B 9/16 | (2006.01) | |

(52) U.S. Cl.
CPC . *C08K 13/02* (2013.01); *B29B 9/12* (2013.01); *C08J 3/124* (2013.01); *C08K 3/0033* (2013.01); *C08L 95/00* (2013.01); *C09J 147/00* (2013.01); *B29B 9/06* (2013.01); *B29B 9/16* (2013.01); *C08J 2325/10* (2013.01)

(58) Field of Classification Search
USPC .................................................. 524/423
See application file for complete search history.

(56) References Cited

U.S. PATENT DOCUMENTS

| | | | |
|---|---|---|---|
| 5,927,620 A | 7/1999 | Memon | |
| 6,238,732 B1 * | 5/2001 | Cameron et al. | 427/208.2 |
| 6,503,968 B1 | 1/2003 | Kim et al. | |
| 6,884,831 B1 | 4/2005 | Memon | |
| 7,371,794 B2 | 5/2008 | Memon | |
| 7,847,006 B2 | 12/2010 | Memon | |
| 2004/0116578 A1 | 6/2004 | Imanishi et al. | |
| 2010/0187718 A1 | 7/2010 | Memon | |

* cited by examiner

*Primary Examiner* — Hui Chin
(74) *Attorney, Agent, or Firm* — Browdy and Neimark, PLLC

(57) ABSTRACT

A raw elastomeric composition in free-flowing pellet form is described, which comprises a raw elastomer with molecular weight from 50,000 to 400,000 Da, and an anti-block agent comprising inorganic fillers, capable of forming emulsions in water. Likewise, a process for obtaining said raw elastomeric compositions in free-flowing pellet form, comprising the steps of: a) polymerizing at least one monomer through solution polymerization in order to obtain elastomer crumb; b) forming an aqueous suspension of the elastomer crumbs; c) dewatering the aqueous suspension; d) adding an anti-block agent comprising inorganic fillers capable of forming emulsions in water; e) drying the dewatered suspension; and f) pelletizing the elastomer to form a raw elastomeric composition in free-flowing pellets form. The raw elastomeric composition in free-flowing pellets form thus obtained can be used as an adhesive composition, in asphalt modification and in asphalt emulsions.

19 Claims, 2 Drawing Sheets

SYNTHETIC RAW ELASTOMERIC COMPOSITIONS IN FREE-FLOWING PELLET FORM AND PROCESS FOR OBTAINING THE SAME

RELATED APPLICATION

This application claims priority to U.S. Provisional Patent Application No. 61/467,733 filed on Mar. 25, 2011, the contents of which are hereby incorporated by reference in their entirety.

TECHNICAL FIELD

The present invention relates to techniques used for the production, storage and application of elastomeric compositions, and more particularly, it is related to elastomeric compositions in free-flowing pellet form and the process for obtaining the same.

BACKGROUND OF THE INVENTION

Synthetic elastomers, in general, are used in a variety of applications, either as such, or as modifiers of the mechanical and/or rheological properties of other polymers or materials. However, many elastomers, such as styrene-butadiene rubbers (SBR) in raw form, tend to agglomerate and form blocks, which in part gives them their usefulness in a variety of applications such as adhesives or impact modifiers, but that makes handling of the same in raw form very difficult.

For instance, the most common raw elastomers of commercial type are SBR elastomers, with styrene monomer content fluctuating from 3 to 45% w/w, with the balance being butadiene. By having the most content of butadiene, one of the properties that is immediately apparent in these materials is their stickiness, which is mainly attributed to the glass transition temperature (transition from solid to viscoelastic stage) that is less than −20° C. In particular, this stickiness is increased when the polymers are heated to temperatures above ambient temperature, and even more if pressure is applied. This phenomenon of stickiness is increased when butadiene and styrene are in a mainly random form and blocks of polystyrene are reduced.

This tackiness property makes impossible to commercialize this type of SBR elastomers in the form of free-flowing pellets, crumbs or particles, inasmuch as over time, the adherence between the particles is increased thus forming naturally blocks, phenomenon that is also known as "cold flow". Because of this fact, regardless of the polymerization process, such SBR elastomers are sold in blocks, usually weighing more than 25 kilograms.

For this reason, raw elastomers are usually commercialized in the form of big blocks and need to be further cut, milled or somehow processed to reduce them to smaller particles depending on the final application. Such processing to reduce particle size must be done on-site or at a time very close to final processing because otherwise the raw elastomer agglomerates again and form solid big blocks.

In order to maintain temporarily raw elastomers in small particles, different anti-block or partitioning agents are used in the prior art, ranging from talc or inorganic fillers to complex compounds with resins, other polymers and waxes have been used. However, the majority of these agents have at least one of the following disadvantages:

a) They require some kind of treatment (heating, chemical or of some other kind) in order to be applied or after applying it to the elastomer.

b) They jeopardize the properties of the elastomer in the final application by compromising tackiness, mechanical or flow properties.

c) The amount required for anti-blocking activity is very high.

d) The anti-blocking effect is limited in terms of temperature conditions and length of time.

Of course all of the above disadvantages impose serious applicability or economical burdens that make the majority of the anti-blocking agents unfeasible or limited in use to elastomeric compositions that have been further formulated, cross-linked or vulcanized, so that with less amount of agent the desired anti-blocking effect is achieved at least temporarily. However, when applied to virgin or raw elastomeric compositions, such agents are usually not useful in the long term so as to be able to commercialize, store and process the same in particle, crumb or pellet form.

One of the applications that are more sensitive to the above described problems is asphalt modification through elastomeric compositions.

Asphalt is a viscous, sticky and black material used as a binder in pavement mixtures for the construction of road surfaces, as well as in waterproofing. In view of the fact that asphalt is a highly impermeable, adhesive and cohesive material, able to withstand high stresses instantaneous and flow under the action of constant loads, it has ideal properties for the construction of road surfaces complying with the following functions: i) waterproof the pavement structure, making it very sensitive to moisture and effective against the penetration of water from rainfall; and, ii) providing an intimate union and cohesion between aggregates, capable of withstanding the mechanical action of disintegration caused by the loads of vehicles.

However, in its virgin state asphalt has rheological and thermomechanical properties limiting its application and usefulness life in pavements. For instance, the softening typical temperatures of virgin asphalts are in the range of 50° C. to 60° C. (rheological-failure temperatures or RFT). However, such temperatures can be improved with the use of polymers that allow RFT higher than 60° C., thus making asphalts more resistant to friction loss associated with rolling of vehicles.

Another interesting property is that virgin asphalts have performance degrees of the PG type of SUPERPAVE (Superior Performing Asphalt Pavements) typical for PG 64-10. The PG range can be extended to 82-22 PG grades with the help of the polymers.

Asphalts modified with polymers were developed with the intention to reduce the requirements of energy for the production, storage and application of asphalts cement in roads. The modified asphalts use polymers that can form three-dimensional networks through vulcanization, formation of crystals or entanglements of the polymer chains.

The objects pursued with the modification of asphalts with polymers are:

a) Having more viscous binders at elevated temperatures in order to reduce the permanent deformation of mixtures composing the bearing layers and increasing the stiffness;

b) Reducing cracking due to thermal effect at low temperatures and fatigue, thus increasing its elasticity; and c) Having a binder with best adhesive features.

SBR elastomeric compositions with molecular weight (Mw) in the range from about 50,000 to 500,000 Daltons in raw form are mostly used to modify asphalts. As mentioned before, these elastomers are commercialized and stored as blocks which subsequently have to be crushed or grinded by the users on-site, thus increasing the costs in the total process of asphalt modification due to both, energy consumption, labor and time.

There have been various solutions tried in the prior art in order to solve the aforesaid problem.

One solution has been emulsifying SBR elastomers in water in order to facilitate incorporation into asphalt. However, for polymers with more than 100,000 Daltons of Mw great difficulties for emulsification have been encountered, and in addition, the high temperatures used in the modification processes of the asphalt, often higher than the evaporation temperature of water, origins flashing or sudden streams of water that can cause accidents, in addition to the oxidation of the asphalt that implies a premature aging factor, which reduces its useful life time in the application of pavement.

These emulsified elastomers have found some application in asphalt emulsions, also well known in the state of the art. These emulsions are mixtures of asphalt with emulsifiers that form a stable emulsification with water, which allows its application on cold asphalt surfaces, that is to say, at temperatures lower than 100° C.

One of these technologies is found in U.S. Pat. No. 6,136,899 wherein a specific type of SBR emulsion can be used to modify asphalt cement to greatly enhance the resistance to shoving, rutting and low temperature cracking of asphalt concretes made therewith. Such SBR emulsion is compatible with virtually all types of asphalt and the modified asphalts have extremely high levels of force ductility, tenacity and toughness. According to this patent, SBR used to modify asphalt cement in the practice of this invention is a blend of (i) a high molecular weight (Mw) styrene-butadiene rubber having an average Mw of at least about 300,000 and (ii) a low Mw styrene-butadiene rubber having an average Mw of less than about 280,000; wherein the ratio of the high Mw styrene-butadiene rubber to the low Mw styrene-butadiene rubber is within the range of about 80:20 to about 25:75, and require further features in the elastomer composition in order to work.

On the other hand, in the U.S. Pat. No. 6,503,968 an asphalt modifier of styrene-butadiene-styrene block copolymer and styrene-butadiene latex is disclosed, which relates to an asphalt modifier comprising 5-30 wt % of dispersed styrene-butadiene-styrene block copolymer and 70-95 wt % of dispersed styrene-butadiene latex, which has an excellent resistance property against plastic deformation, while preventing the occurrence of crack at a low temperature. However, this technology, as mentioned before, has the disadvantage of the need of evaporating water in order to recover the elastomer and in some cases, particularly when modifying the asphalt in temperatures higher than 100° C., with the problems described above. In addition, its application require excess of polymeric latex emulsion, considering that the solids content of these materials fluctuate at levels less than 70% solids, which impacts the final cost of operation.

An improved method for treating crumb rubber particles for use in asphalt compositions is disclosed in U.S. Pat. No. 5,927,620 which is characterized by activating the particles to enhance rheological properties thereof. A slurry of crumb rubber particles is formed by adding water thereto. The slurry is heated to a temperature of 85-90° C. to release excess oils and chemicals from the particles into the slurry. The slurry is dried to produce a fine mesh rubber product with enhanced rheological properties. Such materials have the disadvantage that it is no longer a virgin material, but a cross-linked material mixed with some loads such as carbon black which is used as the main ingredient in tire formulations.

Likewise, U.S. Pat. No. 6,884,831 relates to modified asphalts with partitioning agent and method for making the same, which is characterized by the addition of a partitioning agent to a polymer modifier material such as synthetic rubber to prevent re-agglomeration of the rubber. The partitioning agent is complex and includes a mixture of phenyl-formaldehyde resins and waxes. Whereas reduction of time required to disperse the modifier material in asphalt and lower viscosity of the modified asphalt are reported through the use of such partitioning agent, this technology requires high temperature to incorporate the partitioning agent into the polymer and, due to the resins and waxes contained therein, its use in emulsions and the incorporation in the normal process of production of raw polymers is expensive and difficult because the additive is incompatible with water and, evidently, very difficult to emulsify, thus making the whole process more expensive due to both, energy requirements for incorporation into the polymer and further treatments and additives required at the application in asphalt.

The same disadvantages are found in U.S. Pat. Nos. 7,371,794 and 7,847,006, which refers to the same kind of partitioning agent with phenyl formaldehyde resin and waxes, in the case of the latter with the addition of precipitated silica. As it is easily seen, the disadvantages of these additives with waxes and resins prevail, where the preferred temperatures for addition of the partitioning agent to the polymer are well above 100° C. and a preheating step is necessary in order to make more fluid the resin and waxes.

Likewise, the US Patent Application Serial No. 2010/0187718 relates to a method for making a modified polymer, which is characterized by re-capsulating the polymer via extrusion, through the use of a cross-linking agent that is mixed with particles of synthetic rubber material to form a mixture which is then heated and delivered to an extruding machine. The extruding machine further heats the mixture and produces strands of modified polymer material which are cooled and pelletized to form small pellets of re-capsulated modified polymer. A partitioning or anti-blocking agent of the same type than described in the other patents, namely with phenyl formaldehyde resin and waxes, is added to the pellets to prevent re-agglomeration of the modified polymer.

The modifier materials or anti-block additives described in the U.S. patents mentioned above describe properties that could solve the problem of agglomeration of raw elastomer particles, but have a lot of problems in the process due to the resins and waxes contained therein, which make it difficult and expensive to apply due to the use of temperature, and problems in the drying systems during the processes of production of the elastomers, through increasing the internal pressure in the same and with the need of further additives or processing.

Accordingly, the prior art has not suggested or described raw elastomeric compositions in free-flowing pellet form that, in addition to allowing the commercialization, storage and application as particles, enhance the properties of the rubber when used in further applications, maintaining the properties of the elastomeric composition when used as modifier for asphalts, typical rubber applications or adhesives, in spite of the use of an anti-blocking or partitioning agent. Furthermore, there are not any technologies allowing the incorporation of an anti-blocking or partitioning agent without the need of further processing or the use of more additives, without compromising the properties of the elastomer in the final applications and with anti-blocking effects achieved for long storage times and high weights, thus allowing commercialization in crumb, pellet or particle form.

BRIEF DESCRIPTION OF THE INVENTION

Objects of the Invention

Considering the defects of the prior art, it is an object of the present invention to provide raw elastomeric compositions in free-flowing pellet form that can be obtained, stored and commercialized in such form, with large periods of storage allowing keeping such form during transportation and use, without compressing thereof again and avoiding the formation of large blocks that difficult their utilization.

Moreover, it is another object of the present invention to provide raw elastomeric compositions in free-flowing pellet form such that, in addition to keep the expected properties of the raw material in the final application, enhance some properties when used in certain applications, without the need of further processes or additives.

It is a further object of the present invention to provide raw elastomeric compositions in free-flowing pellet form such that may be used in less quantities than other compositions in the prior art for the same applications.

It is another object of the present invention to provide a process for obtaining raw elastomeric compositions in free-flowing pellet form such that may be easily used in emulsified applications and produced without the need of heat and in the absence of waxes or complex additives during the production of the raw elastomeric composition, but allowing further processing with easiness in final applications such as asphalts, emulsified asphalts, adhesives or rubber forming.

It is also an object of the present invention to provide modified asphalts with enhanced mechanical properties through the addition of the raw elastomeric compositions in free-flowing pellet form, including the use in emulsified asphalts.

It is still another object of the present invention to provide an adhesive composition that keeps its adhesive properties above the minimum parameters required for applications as adhesives, in spite of being in free-flowing pellet form and not showing agglomeration.

All of the above objects are achieved through a raw elastomeric composition comprising an elastomer with molecular weight from 50,000 to 400,000 Da and an anti-block agent containing emulsifiable inorganic fillers. The process for obtaining the composition includes the step of adding the anti-block agent at the last drying stage of the raw elastomer, which anti-block agent is incorporated either as an emulsion or in solid form, without the need of pretreatment or additional heat for incorporation thereof.

BRIEF DESCRIPTION OF THE DRAWINGS

The novel features of the present invention are established particularly in the appended claims. However, the invention itself together with other objects and advantages thereof will be better understood in the following detailed description of a specific embodiment, when read along with the appended figures, in which:

DETAILED DESCRIPTION OF THE INVENTION

Figure 1:
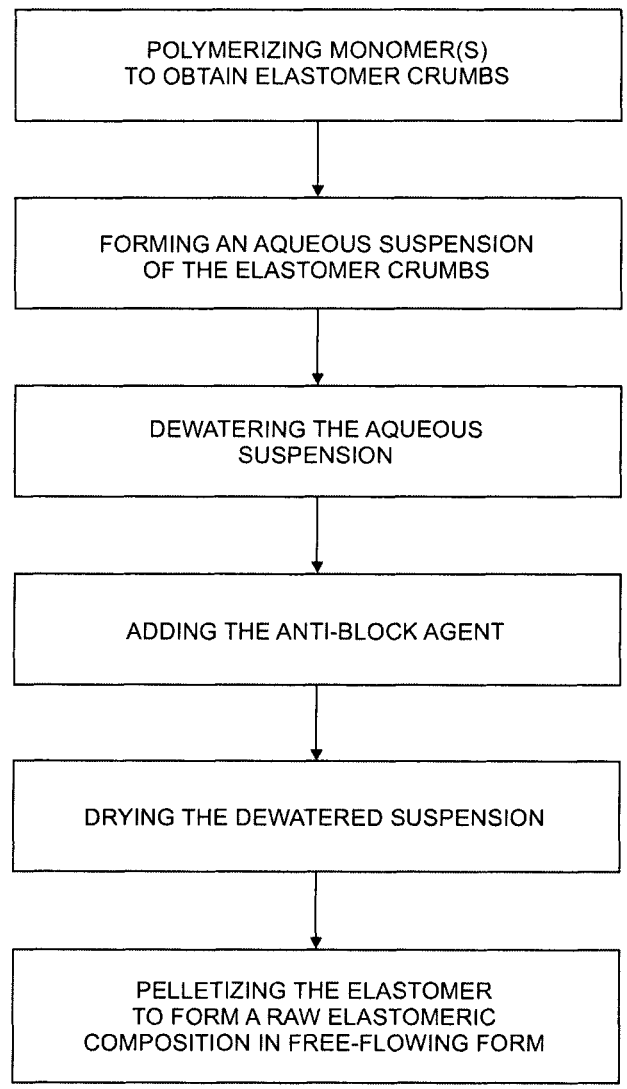
FIG. 1 is a block diagram showing the step sequence of the process for obtaining raw elastomeric compositions in free-flowing pellet form, developed according to the present invention.

In spite of the normal effect that inorganic fillers have in the properties of raw elastomeric compositions, through the use of emulsifiable inorganic fillers, the present invention provides raw elastomeric compositions in free-flowing pellet form that can be obtained, stored and commercialized in such form, with large periods of storage allowing keeping such form during transportation and use, without compressing thereof again but that, in addition to keep the expected properties of the raw material in the final application, enhance some properties when used in certain applications, without the need of further processes or additives.

According to the principles of the present invention, the raw elastomeric compositions in free-flowing pellet form comprise:

a) a raw elastomer with molecular weight from 50,000 to 400,000 Da; and, b) from 0.1 to 15% by total weight of an anti-block agent containing inorganic fillers capable of forming emulsions in water.

As used herein, the term "raw elastomer" refers to any elastomer that has not suffered a cross-linking, vulcanization or chemical treatment after being obtained from a polymerization process.

In a preferred embodiment of the present invention, the elastomer is selected between Solution-SBR, Emulsion-SBR, SB di-block copolymers and tapered triblock copolymers, but styrene—butadiene copolymers with butadiene content higher than 60% weight/weight are particularly preferred.

The tapered triblock copolymers include, but are not limited to, elastomers and thermoplastic elastomers made from block copolymers of styrene (S), butadiene (B), and/or isoprene (I) of varying sizes and number of blocks. Examples of such elastomers and thermoplastic elastomers include (S/B-rich)-(B/S-rich)-S, (S/I-rich)-(I/S-rich)-S, (S/B)-S, (S/I)-S, (S/B)m-S and (S/I)m-S (where m is an integer), S-(S/B-rich)-(B/S-rich)-S, S-(S/I-rich)-(I/S-rich)-S, S-(B/S-rich)-(S/B-rich)-(B/S-rich)-S, S-(I/S-rich)-(S/I-rich)-(I/S-rich)-S, [S-(B/S-rich)-(S/B-rich)]n-X, [S-(I/S-rich)-(S/I-rich)]n-X, X-[S-(B/S-rich)-(S/B-rich)]n, X-[S-(I/S-rich)-(S/I-rich)]n (where X is the residue of either a coupling agent or a multifunctional initiator and n is an integer from 2 to about 30) tapered triblock copolymers as well as their hydrogenated, selectively hydrogenated, and partially hydrogenated counterparts. These tapered triblock copolymers are disclosed in U.S. patent application Ser. No. 13/361,740, which is incorporated herein by reference.

As for the inorganic fillers contained in the anti-block agent, they are selected from the group consisting of metallic carbonates, metallic sulfates, metallic oxides, metallic hydroxides, metallic aluminosilicates, alumina, silica, talc and combinations thereof, in combination with a compatible emulsifier capable of forming emulsions of the same in water; preferably, the inorganic fillers are selected from the group consisting of calcium carbonate, magnesium sulfate, calcium oxide, titanium dioxide, calcium hydroxide, potassium aluminosilicate, calcium aluminosilicate, alumina, silica, talc and combinations thereof, more preferably the inorganic fillers are selected from the group consisting of magnesium sulfate, titanium dioxide, calcium hydroxide, silica, potassium aluminosilicate, calcium aluminosilicate, talc and combinations thereof, and the emulsifier is selected from alkaline salts of organic fatty esters with less than 20 carbon atoms, more preferably stearates.

In a particularly preferred embodiment, the anti-block agent comprises:
  a) 3-9% w/w calcium hydroxide;
  b) 0.3-1.1% w/w talc;
  c) 0.5-2% w/w titanium dioxide;
  d) 0.3-1% w/w calcium aluminosilicate;
  e) 0.2-0.7% w/w potassium aluminosilicate
  f) 0.5-1.5% w/w magnesium sulfate;
  g) 75-85% w/w silica; and
  h) 7-11% w/w calcium stearate.

The anti-block agent can be used in powder form or as a water-based emulsion with solids content from about 5 to about 50% by weight. In a specific embodiment of the present invention, the anti-block agent is added in the range of 2 to 8% by weight.

The raw elastomeric compositions in free-flowing pellet form of the present invention have a maximum particle size of 2 inches; a melt flow index of 3 to 13.1 g/10 minutes at 190° C. y 2.16 Kilos and at 200° C. and 5 Kilos, respectively, and require a maximum force of 15 kgf to loosen into particle form again after applying a continuous force of 2.76 kg at 50° C. for 90 hours.

The process for obtaining raw elastomeric compositions in free-flowing pellet form of the present invention, as shown in FIG. 1, comprises the following steps:
  a) Polymerizing at least one monomer through solution polymerization in order to obtain elastomer crumbs;
  b) Forming an aqueous suspension of the elastomer crumbs to eliminate polymerization solvents and residues;
  c) Dewatering the aqueous suspension to achieve a maximum water content of 25% by weight;
  d) Adding from 0.1 to 15% of an anti-block agent comprising inorganic fillers capable of forming emulsions in water;
  e) Drying the dewatered suspension to achieve a maximum water content of 1%; and
  f) Pelletizing the elastomer to form a raw elastomeric composition in free-flowing pellets form with maximum particle size of 2 inches.

The polymerization and suspension steps of the process are well known in the prior art, and the specific conditions for polymerization and suspension will be readily known to those skilled in the art and depend on the final application of the elastomer obtained therein.

In a particularly preferred embodiment of the present invention, the dewatering stage is performed through an extrusion equipment of the type known as single screw spindle, wherein the screw cover has ribs at the lower section of the extrusion equipment partially open to eliminate the squeezed water, but without allowing pass the wet lumps of elastomer.

Likewise, the drying step may be performed through extrusion processes, wherein the anti-block additive is preferably added through the hopper of the extrusion equipment. It is particularly preferred for the drying step extrusion equipment of the single screw type having a variable configuration.

In the preferred embodiment where the extrusion process is used for the drying stage, the elastomer leaving the extruder is immediately pelletized and the obtained pellets are optionally further dried, preferably through a fluidized bed process with hot air.

In an additional embodiment of the invention, the pellets finally obtained are sprayed again with the anti-block additive in emulsified form with solids content from about 5 to about 50% by weight.

The raw elastomer composition in free-flowing pellet form of the present invention can be packed in bags or cardboard boxes of up to 1 ton and will keep its form for at least one year, featuring free-flowing at all times and without re-agglomeration.

The raw elastomer composition in free-flowing pellet form of the present invention can be used as an adhesive composition that keeps its adhesive properties above the minimum parameters required for applications as adhesives, even when it is in free-flowing pellet form and it does not agglomerate, and in spite of containing inorganic compounds. Additionally, the raw elastomer composition in free-flowing pellet form of the present invention can be used to obtain modified asphalts through the addition of 1 to 6% by weight of said raw elastomer composition in free-flowing pellet form to the asphalt. The modified asphalt thus obtained has a maximum rheological-failure temperature (RFT) of at least 90° C. Furthermore, the raw elastomer composition in free-flowing pellet form of the present invention can be used to obtain a modified asphalt emulsion through the addition of 1 to 6% by weight of said raw elastomer composition in free-flowing pellet form to the asphalt emulsion.

EXAMPLES

Using the process of the present invention, with extrusion processes for dewatering and drying, different pellets of a specific embodiment of the present invention were obtained with SBR elastomers, which were evaluated for performance without the combination of the anti-block additive, as well as with different amounts of the same. The dewatering stage for all examples was performed through an extrusion equipment of the type known as single screw spindle.

In turn, for all examples, the drying step was performed through an extrusion equipment of the single screw type having a variable configuration, and the elastomer leaving the extruder was immediately pelletized and the obtained pellets were dried through a fluidized bed process with hot air, except for Examples 1 and 3.

Example 1

Raw Elastomer without Anti-Block Agent

The SBR elastomer was obtained as described above, with molecular weights of 109,000 Daltons and a monomer ratio 25/75 styrene/butadiene, but no anti-blocking agent was used for this process. The material obtained in this example was designated E1 and it was characterized and used as a reference for comparison in testing.

Example 2

Raw Elastomer with Anti-Block Agent of the Present Invention

The SBR elastomer was obtained as described for Example 1, but an anti-blocking agent was incorporated to the extruder prior to the drying step. The anti-blocking agent was a mixture of calcium carbonate, magnesium sulfate, calcium oxide, calcium hydroxide, potassium aluminosilicate, calcium aluminosilicate, alumina, titanium dioxide, silica and talc, in combination with sodium estearate as compatible emulsifier.

The anti-block agent was used in powder form or as a water-based emulsion and it was added in different proportions. Through this process Examples 2A, 2B and 2C were developed, using respectively 2%, 3.5% and 6% by weight (dry base) of the anti-blocking agent. The materials obtained were further characterized and tested.

Example 3

Raw Elastomer without Anti-Block Agent

The SBR elastomer was obtained as described above, but this time with molecular weights of 240,000 Daltons and a monomer ratio 15/85 styrene/butadiene, but no anti-blocking agent was used for this process. The material obtained in this example was designated E3 and it was characterized and used as a reference for comparison in testing.

Example 4

Raw Elastomer with Anti-Block Agent of the Present Invention

The SBR elastomer was obtained as described in Example 3, but an anti-blocking agent was incorporated to the extruder prior to the drying step. The anti-blocking blocking agent was a mixture of calcium carbonate, magnesium sulfate, calcium oxide, alumina, titanium dioxide, silica and talc, in combination with sodium estearate as compatible emulsifier. The anti-block agent was used in powder and it was added in different proportions, but the extruder was an equipment of the single screw type having a variable configuration. Through this process Examples 4A, 4B and 4C were developed, using respectively 2%, 3.5% and 6% by weight (dry base) of the anti-blocking agent. The materials obtained were further characterized and tested.

All of the materials obtained in the examples were measured two "critical" parameters. Firstly, its adhesive properties were measured in order to verify whether the material could be used for adhesive applications or not. The results are shown for all the materials in Table 1 below:

TABLE 1

Adhesive properties

| PROPERTY | SPECIFICATION | E1 | E2-A | E-2-B | E2-C |
|---|---|---|---|---|---|
| Brookfield viscosity at 177° C., cP | 5741 maximum | 5289 | 5301 | 5423 | 5507 |
| Softening temperature, ° C. | 75 minimum | 75 | 75.6 | 76 | 76.9 |
| Tension, MPa | 1.4 minimum | 1.5 | 1.4 | 1.4 | 1.4 |
| Loop Tack, kgf | 1.59 minimum | 4.08 | 4.22 | 4.31 | 4.40 |
| Peel, kgf | 1.81 minimum | 3.81 | 3.76 | 3.72 | 3.63 |
| Shear, minutes | 33 minimum | 55 | 52 | 48 | 44 |

As it can be readily seen, even though the adhesive properties are jeopardized as expected, the parameters are still above the minimum required for applications of these elastomers as adhesives in spite of the presence of the anti-block agent of the present invention, which was unexpected because the properties are usually affected greatly by inorganic fillers.

In addition, samples of the materials were subjected to a compression test. The test consisted of filling with each material of the examples a hollow cylinder of 628.3 cm3 of volume (12.5 cm height and 8 cm the diameter of the base). With the material inside the cylinder, another cylinder of 2.76 kg was put on the material and the whole system was kept at 50° C. for 90 hours. After such time, the force required to divide into particles again the material after taking it from the cylinder was measured for all the materials, according to the following:

TABLE 2

Degree of force required to divide into particles the block formed in the compression test

| Force range | Observation |
|---|---|
| ≥60-80 kgf | The material is totally compressed, being impossible to divide it with a hand. |
| 40-50 kgf | The material shows some compacting. It can be divided with some effort. |
| 15-30 kgf | The material takes the form of a compact cylinder, being easily divided with a hand. |
| <15 kgf | The material is totally flowing, being difficult that it forms a block. |

The compression test simulates the storage conditions of the materials, i.e. a period of 6 months and at least 700 kg of material over the last layer of material.

The results of this compression test are shown in Table 3 below.

TABLE 3

Forces needed to loosen the materials after compression test.

| | E1 | E2-A | E2-B | E2-C | E3 | E4-A | E4-B | E4-C |
|---|---|---|---|---|---|---|---|---|
| Force (kgf) | >160 | >40 | >30 | <10 | >160 | 30-40 | <15 | <5 |

According to the above, it is evident that the materials of the present invention require very little force to recover the pellet form, which is equivalent to pushing the material with the finger. Therefore, the materials obtained with the principles of the present invention can be stored and transported in pellet form without the risk of agglomeration and block forming.

Example 5

Comparison of Anti-Block Agents

Compositions containing the SBR elastomer of Example 1 and different materials used as anti-block agents, corresponding to Examples 5A to 5O, were subjected to the compression test in order to compare their performance. The additives used were: Petrolite 01 Dispersion (E5A); micronized hydroxilated polyethylene wax (E5B), calcium stearate (E5C), industrial talc (E5D), calcium carbonate (E5E), Barbe 237 (emulsified calcium carbonate) (E5F), erucamide (E5G), crodamide (E5H), talc (E5I), gilsonites (E5J), diatomeaceous earth (E5K), Reagent A (E5L), Reagent B (E5M), Aquastab reagent (pulverized and micronized polyethylene) (E5N) and the additive of the present invention (E5O). The results are shown in Table 4:

TABLE 4

Performance of several anti-block agents in compression test

| Anti-block agent | \multicolumn{6}{c}{Concentration of anti-block agent in the composition, %} | |
|---|---|---|---|---|---|---|---|
| | 1 | 1.5 | 2 | 3 | 4 | 5 | Others |
| E5A - Petrolite 01 Dispersion (Baker Hughes, 2003) | 68 kgf | | | 57 kgf | | 40 kgf | |
| E5B - Micronized hydroxilated polyethylene wax (Baker Hughes, 2003) | >50 kgf | | | >50 kgf | | >50 kgf | |
| E5C - Calcium stearate (Corporacion Sierra Madre, 2005) | 72 kgf | | | 52 kgf | 36 kgf | 27 kgf | |
| E5D - Industrial talc (OMYA, 2004) | 78 kgf | | | | | 50 kgf | |
| E5E - Calcium carbonate (Minstron, 2005) | | | | 65 kgf | | 42 kgf | |
| E5F - Barbe 237 (emulsified calcium carbonate) (Barbe America Inc., 2003) | | | | 57 kgf | | 40 kgf | |
| E5G - Erucamide (Croda, 2007) | >150 kgf | | | >150 kgf | | >150 kgf | |
| E5H - Crodamide (Croda, 2007) | >150 kgf | | | >150 kgf | | >150 kgf | |
| E5I - Talc (Cognis, 2007) | >500 kgf | >500 kgf | | | | | >500 kgf (at 6%) |
| E5J - Gilsonites (325 and 300, ER125) (American Gilsonite, 2009) | >200 kgf | | | >200 kgf | | >200 kgf | |
| E5K - Diatomeaceous earth (Chemtex Int. de Mex., 2006) | >300 kgf | >300 kgf | >300 kgf | | >200 kgf | | |
| E5L - Reagent A (Moore & Murger, 2006) | | 67 kgf | | 49 kgf | | 42 kgf | |
| E5M - Reagent B (Moore & Murger, 2006) | | 78 kgf | | 76 kgf | | 70 kgf | |
| E5N - Aquastab reagent (pulverized and micronized polyethylene) (Eastman, 2007) | | | | | | | >500 kgf |
| E5O - Additive of the present invention | >120 kgf | | | >40 kgf | >30 kgf | | <10 kgf (E2C) |

As can be seen from above, the materials of the present invention require less force to recover the pellet form after being subjected to the compression test, when compared to elastomers modified with other anti-block agents.

Now then, in order to measure the features of the materials of the present invention, the materials were tested as asphalt modifiers. The material was added to an asphalt grade AC-20, with a penetration of 60-80 1/10 mm at 25° C., which was heated to a temperature of 170-195° C., with a stirring of 600 rpm.

TABLE 5

Results of modified asphalt of Examples 1 and 2 SBR block (styrene-butadiene ratio 25/75) and SBR pellets with anti-block additive.

| PROPERTY | TEST METHOD | E1 | E2-A | E2-B | E2-C |
|---|---|---|---|---|---|
| \multicolumn{6}{l}{MIXTURE WITH 2% W/W POLYMER IN ASPHALT.} |
| Elastomer dispersion time in asphalt, minutes | Fluorescence Microscopy with referente | 90 | 80 | 90 | 90 |
| Softening temperature, ° C. | ASTM D36 | 57 | 57 | 57 | 57 |
| Penetration at 25° C., 100 g, 5 s, 1/10 mm | ASTM D5 | 54 | 53 | 53 | 52 |
| Brookfield viscocity at 135° C. | ASTM D4402 | 975 | 975 | 900 | 1000 |
| Torsional elastic recovery, % | IRAM 6830 | 18 | 21 | 20 | 22 |
| \multicolumn{6}{l}{MIXTURE WITH 3% W/W POLYMER IN ASPHALT.} |
| Elastomer dispersion time in asphalt, minutes | Fluorescence Microscopy with referente | 90 | 80 | 90 | 90 |
| Softening temperature, ° C. | ASTM D36 | 65 | 64 | 65 | 64 |
| Penetration at 25° C., 100 g, 5 s, 1/10 mm | ASTM D5 | 51 | 49 | 51 | 51 |

TABLE 5-continued

Results of modified asphalt of Examples 1 and 2 SBR block (styrene-butadiene ratio 25/75) and SBR pellets with anti-block additive.

| PROPERTY | TEST METHOD | E1 | E2-A | E2-B | E2-C |
|---|---|---|---|---|---|
| Brookfield viscocity at 135° C. | ASTM D4402 | 1413 | 1388 | 1388 | 1400 |
| Torsional elastic recovery, % | IRAM 6830 | 20 | 22 | 22 | 23 |
| MIXTURE WITH 4% W/W POLYMER IN ASPHALT. | | | | | |
| Elastomer dispersion time in asphalt, minutes | Fluorescence Microscopy with reference | 110 | 100 | 100 | 105 |
| Softening temperature, ° C. | ASTM D36 | 66 | 69 | 66 | 66 |
| Penetration at 25° C., 100 g, 5 s, 1/10 mm | ASTM D5 | 48 | 44 | 48 | 44 |
| Brookfield viscocity at 135° C. | ASTM D4402 | 1825 | 1837 | 1862 | 1875 |
| Torsional elastic recovery, % | IRAM 6830 | 21 | 25 | 24 | 24 |

As it can be seen from the results in Table 5, the additive does not affect the main thermo-mechanical properties. For example, the torsional elastic recovery at 25° C. shows that the additive even slightly improves this property, and the majority of the parameters such as penetration, viscosity and dispersion time are either improved or kept as with the typical block elastomer used in the prior art without anti-blocking agent. For the particular case of viscosity, the SHRP-SUPER-PAVE criterion sets that the maximum allowed viscosity at 135° C. is 3000 cP, which is fulfilled in all cases.

The samples were tested also for the maximum Rheological-Failure Temperature (RFT). This is the temperature at which the ratio of complex modulus or stiffness divided by the angle of deformation of the asphalt is below or equal to 1 kPa, which is a fundamental rheological specification on modified asphalts.

Figure 2:
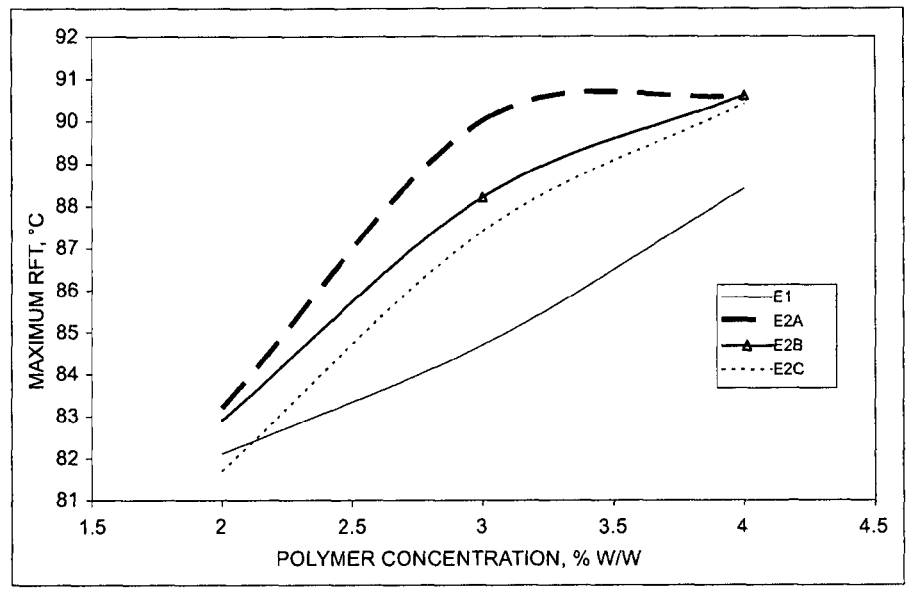
FIG. 2 is a graphic showing the maximum temperature of rheological failure (RFT) of several specific embodiments of the claimed raw elastomeric compositions in free-flowing pellet form.

The profile of RFT with different amounts of the polymer composition of the present invention is shown in FIG. 2. As it is easily seen, desirable high temperatures are achieved with very low quantities of the polymer composition of the present invention, which means that not only the anti-block agent used to preserve the pellet form is not jeopardizing the properties of the asphalt, but rather such composition is improving the properties, as less amount of elastomer is required to achieve the same RFT, which for very strict applications such as airport asphalts, the RFT is set at 66° C.

Figure 3:
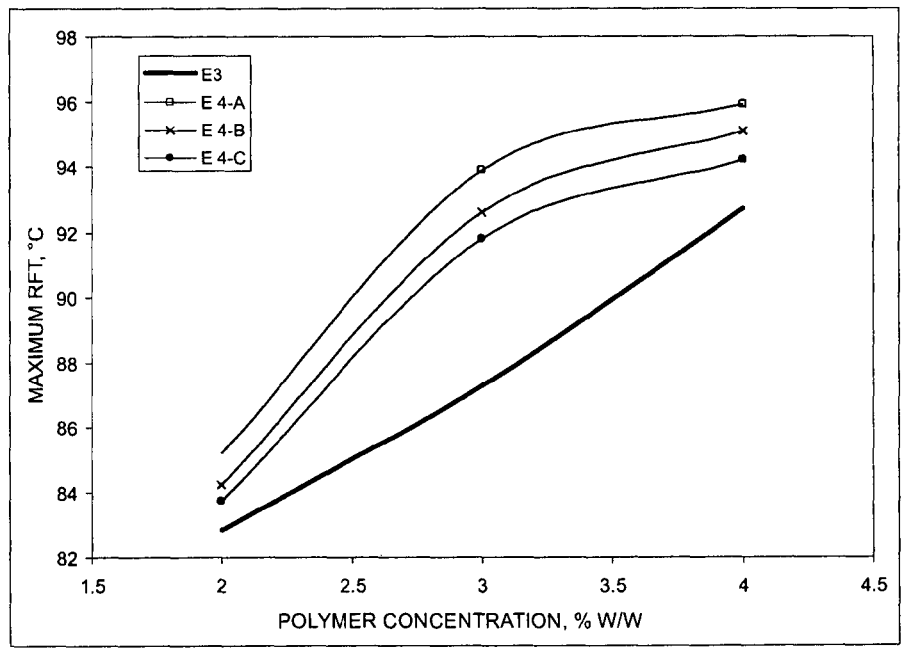
FIG. 3 is a graphic showing the maximum temperature of rheological failure (RFT) of another specific embodiments of the claimed raw elastomeric compositions in free-flowing pellet form.

The same testing was performed with Examples 3 and 4, which results are shown in Table 6 and FIG. 3, and which also shows that the composition of the present invention does not affect asphalt as modifier, but it rather improves some of the properties of the modified asphalt.

TABLE 6

Results of modified asphalt of Examples 3 and 4 SBR block of 240,000 Da (styrene-butadiene ratio 15/85) and SBR pellets with anti-block additive.

| PROPERTY | TEST METHOD | E3 | E4-A | E4-B | E4-C |
|---|---|---|---|---|---|
| MIXTURE WITH 2% W/W POLYMER IN ASPHALT. | | | | | |
| Elastomer dispersion time in asphalt, minutes | Fluorescence Microscopy with reference | 100 | 90 | 95 | 100 |
| Softening temperature, ° C. | ASTM D36 | 63 | 63 | 63 | 64 |
| Penetration at 25° C., 100 g, 5 s, 1/10 mm | ASTM D5 | 48 | 49 | 48 | 48 |
| Brookfield viscocity at 135° C. | ASTM D4402 | 1112 | 1110 | 1112 | 1111 |
| Torsional elastic recovery, % | IRAM 6830 | 29 | 31 | 30 | 30 |
| MIXTURE WITH 3% W/W POLYMER IN ASPHALT. | | | | | |
| Elastomer dispersion time in asphalt, minutes | Fluorescence Microscopy with reference | 110 | 110 | 105 | 110 |
| Softening temperature, ° C. | ASTM D36 | 68 | 68 | 69 | 68 |
| Penetration at 25° C., 100 g, 5 s, 1/10 mm | ASTM D5 | 43 | 42 | 41 | 40 |
| Brookfield viscocity at 135° C. | ASTM D4402 | 1632 | 1628 | 1609 | 1613 |
| Torsional elastic recovery, % | IRAM 6830 | 34 | 35 | 37 | 38 |
| MIXTURE WITH 4% W/W POLYMER IN ASPHALT. | | | | | |
| Elastomer dispersion time in asphalt, minutes | Fluorescence Microscopy with reference | 120 | 115 | 115 | 115 |
| Softening temperature, ° C. | ASTM D36 | 71 | 72 | 72 | 71 |
| Penetration at 25° C., 100 g, 5 s, 1/10 mm | ASTM D5 | 38 | 38 | 38 | 37 |
| Brookfield viscocity at 135° C. | ASTM D4402 | 2015 | 2010 | 2013 | 2014 |
| Torsional elastic recovery, % | IRAM 6830 | 36 | 37 | 38 | 38 |

Example 6

Asphalt Emulsions

The materials of the present invention were tested and compared to the traditional products used in asphalt emulsions for chip seals. The materials evaluated were EVA (E6A), butonal (E6B); SBR elastomer of Example 1 (E6C and E6D) and the materials obtained in Examples 2A and 2B (E6E and E6F).

The results are shown in Table 7.

TABLE 7

Results of asphalt emulsions for chip seals

| PARAMETER | METHOD | SPECIFICATION | CONVENTIONAL RAW ASPHALT CQS-65 | E6A (EVA AT 3%) | E6B (BUTONAL 3% SBR) | E6C (E1 at 2.4%/) | E6D (E1 at 3%) | E6E (E2A) | E6F (E2B) |
|---|---|---|---|---|---|---|---|---|---|
| EMULSION PROPERTIES | | | | | | | | | |
| 20 mesh retention, % | MMMP-4-05-014 | Lower than 1% | 0 | 0 | 0 | 0 | 0.1 | 0.2 | 0.3 |
| Discharge time in pavement, seconds | | 300 a 600 | 100 | 300 | 323 | 520 | 567 | 480 | 586 |
| SF viscosity at 50° C., seconds | MMMP-4-05-004 | 64 a 180 | 135 | 68 | 160 | 170 | 179 | 173 | 179 |
| Asphalt cement content, % w/w | | Minimum 65% | 65.7 | 67 | 67 | 65 | 65 | 65 | 65 |
| Settling at 1 day, % | MMMP-4-05-013 | Maximum 1% | 0.76 | 0 | 0.2 | 0.2 | 0.3 | 0.2 | 0.3 |
| Settling at 5 days, % | MMMP-4-05-013 | Maximum 3% | 0.78 | 0 | 0.2 | 0.2 | 0.4 | 0.3 | 0.4 |
| ASPHALT RESIDUE PROPERTIES | | | | | | | | | |
| Elastic recovery by ductilometer at 10° C., % | | Minimum 40 | Not measured | 25 | 43 | 40 | 47 | 43 | 51 |
| Elastic recovery by ductilometer at 25° C., % | | Minimum 50 | Not measured | 30 | 48 | 50 | 55 | 52 | 57 |
| Ductility at 4° C., cm | | Minimum 30 | Not measured | 10 | 14 | 14 | 30 | 9.5 | 30 |
| Residue adherence | Australian T230 | Minimum 85% | 70 | 78 | 83 | 87 | 93 | 88 | 94 |
| Active adherence | Boiling | Minimum 90% | 75 | 80 | 90 | 93 | 98 | 93 | 98 |

As it can be seen from results of Table 7, the additive does not affect the properties of asphalt emulsions for use in chip seals, but it rather improves the adherence properties when compared to the products that are traditionally used for this purpose, even when less amount of the material of the present invention is used.

Accordingly, the present invention should not be interpreted only in the light of the examples, as many variations such as different elastomers or specific compositions of the anti-block agent used in the present invention might be apparent from the specification in full. Accordingly, the present invention shall be limited only by the scope of the appended claims.

The invention claimed is:

1. A raw elastomeric composition in free-flowing pellet form comprising:
    a) a raw elastomer with molecular weight from 50,000 to 400,000 Da; and,
    b) from 1 to 15% by total weight of an anti-block agent comprising inorganic fillers, capable of forming emulsions in water, wherein the anti-block agent is not applied as an outer layer of the composition in free-flowing pellet form.

2. The elastomeric composition of claim 1, wherein the elastomer is selected between solution-SBR, emulsion-SBR, SB di-block copolymers and tapered triblock copolymers.

3. The elastomeric composition of claim 2, wherein the elastomer is a styrene-butadiene copolymer with butadiene content higher than 60% weight/weight.

4. The elastomeric composition of claim 1, wherein the inorganic fillers contained in the anti-block agent are selected from the group comprising metallic carbonates, metallic sulfates, metallic oxides, metallic hydroxides, metallic aluminosilicates, alumina, silica, talc and combinations thereof, in combination with a compatible emulsifier capable of forming emulsions of the same in water.

5. The elastomeric composition of claim 4, wherein the inorganic fillers contained in the anti-block agent are selected from the group comprising calcium carbonate, magnesium sulfate, calcium oxide, titanium dioxide, calcium hydroxide, potassium aluminosilicate, calcium aluminosilicate, alumina, silica, talc and combinations thereof.

6. The elastomeric composition of claim 5, wherein the inorganic fillers contained in the anti-block agent are selected from the group comprising magnesium sulfate, titanium dioxide, calcium hydroxide, silica, potassium aluminosilicate, calcium aluminosilicate, talc and combinations thereof.

7. The elastomeric composition of claim 4, wherein the compatible emulsifier is selected from alkaline salts of organic fatty esters with less than 20 carbon atoms.

8. The elastomeric composition of claim 7, wherein the compatible emulsifier is a stearate.

9. The elastomeric composition of claim 1, wherein the anti-block agent comprises:

a) 3-9% w/w calcium hydroxide;
b) 0.3-1.1% w/w talc;
c) 0.5-2% w/w titanium dioxide;
d) 0.3-1% w/w calcium aluminosilicate;
e) 0.2-0.7% w/w potassium aluminosilicate
f) 0.5-1.5% w/w magnesium sulfate;
g) 75-85% w/w silica; and
h) 7-11% w/w calcium stearate.

10. The elastomeric composition of claim 1, wherein the anti-block agent can be used in powder form or as a water-based emulsion with solids content from about 5 to about 50% by weight.

11. The elastomeric composition of claim 1, wherein the anti-block agent is added in the range of 2 to 8% by weight.

12. The elastomeric composition of claim 1, wherein the pellets have a maximum particle size of 2 inches.

13. The elastomeric composition of claim 1, wherein it has a melt flow index of 3 to 13.1 g/10 min.

14. The elastomeric composition of claim 1, wherein it is required a maximum force of 120 kgf to loosen into particle form again after applying a continuous force of 2.76 kg at 50° C. for 90 hours.

15. A process for obtaining raw elastomeric compositions in free-flowing pellet form, comprising the steps of:
    a) polymerizing at least one monomer through solution polymerization in order to obtain elastomer crumbs;
    b) forming an aqueous suspension of the elastomer crumbs to eliminate polymerization solvents and residues;
    c) dewatering the aqueous suspension to achieve a maximum water content of 25% by weight;
    d) adding from 0.1 to 15% by weight of an anti-block agent comprising inorganic fillers capable of forming emulsions in water;
    e) drying the dewatered suspension to achieve a maximum water content of 1% by weight; and
    f) pelletizing the elastomer to form a raw elastomeric composition in free-flowing pellets form with maximum particle size of 2 inches, wherein the anti-block agent is not applied as an outer layer of the composition in free-flowing pellet form.

16. The process for obtaining elastomeric compositions of claim 15, wherein the dewatering stage is performed through an extrusion equipment known as single screw spindle.

17. The process for obtaining elastomeric compositions of claim 15, wherein the drying step is performed through extrusion processes.

18. The process for obtaining elastomeric compositions of claim 16, wherein the drying step is performed through single screw extrusion equipment having a variable configuration.

19. The process for obtaining elastomeric compositions of claim 16, wherein the elastomeric composition is additionally dried in another step through a fluidized bed process with hot air.

* * * * *